United States Patent [19]

Alagy et al.

[11] 3,935,100
[45] Jan. 27, 1976

[54] PROCESS FOR THE TREATMENT OF WASTE WATERS CONTAINING SULFURIC ACID AND/OR AMMONIUM SULFATE

[75] Inventors: Jacques Alagy, Lyon; Christian Busson, Rueil Malmaison; Maurice Cessou, Communarg, all of France

[73] Assignee: Institut Francais du Petrole, Paris, France

[22] Filed: June 28, 1974

[21] Appl. No.: 484,228

[30] Foreign Application Priority Data
June 29, 1973 France .................. 73.24127
Dec. 4, 1973 France .................. 73.43318
Mar. 6, 1974 France .................. 74.08095

[52] U.S. Cl. .............. 210/45; 210/47; 210/48; 210/50; 423/158
[51] Int. Cl.² ............ C02B 1/34; C02C 5/06
[58] Field of Search ........... 210/42, 45, 47–53, 210/63, 67, 71; 423/158, 166, 170, 554

[56] References Cited
UNITED STATES PATENTS

| | | | |
|---|---|---|---|
| 624,041 | 5/1899 | Jacobs | 423/170 |
| 1,557,188 | 10/1925 | Newlands | 210/53 |
| 1,959,305 | 5/1934 | Rentschler | 423/158 |
| 2,094,902 | 10/1937 | Muller | 423/554 |
| 2,863,732 | 12/1958 | Bowers et al. | 210/50 X |
| 3,784,680 | 1/1974 | Strong et al. | 423/554 X |

Primary Examiner—Thomas G. Wyse
Attorney, Agent, or Firm—Millen, Raptes & White

[57] ABSTRACT

Process for treating a waste water containing sulfuric acid and/or ammonium sulfate comprising (1) reacting said water with barium sulfide to form barium sulfate, (2) reacting the latter with carbon containing inorganic impurities, at high temperature, thereby forming barium sulfide, at least a major portion of which is recycled to step (1), and a gas which is separated, (3) dissolving in water a minor portion of the barium sulfide produced in step (2), separating the insoluble impurities therefrom and recycling at least one portion of the resulting purified solution to step (1).

24 Claims, 4 Drawing Figures

PROCESS FOR THE TREATMENT OF WASTE WATERS CONTAINING SULFURIC ACID AND/OR AMMONIUM SULFATE

In the course of numerous chemical operations and various treatments, solutions of sulfuric acid are used. The waste waters from said operations are polluted by organic and inorganic impurities and by free sulfuric acid whose concentrations are variable to a large extent.

The discharge of these waste waters resulting in a pollution of waters, difficult problems have to be solved by the industry in order to comply with more and more severe regulations in this field. As a matter of fact, this water cannot be sent to the plants usually used for the treatment of waste waters, due to the presence of sulfuric acid. The neutralization by CaO, as carried out in numerous plants, requires to solve the problem of the discharge of the formed $CaSO_4$. Other waste waters contain ammonium sulfate.

SUMMARY

The object of this invention is to provide a general method for treating such waste waters irrespective of their origin and their concentration. This method permits to recover and recycle sulfur. It is particularly convenient for treating waste waters of low sulfuric acid content, for example from 1 to 40 percent by weight. These waters may also contain soluble sulfates, for example ammonium sulfates or various metal sulfates.

The optimum concentration being from 10 to 30 percent b.w. , when various waste waters of different origin are available, it is possible by admixing them, to adjust the sulfuric content of the resulting mixture. When the total concentration is greater than 30 percent by weight, we can proceed to a dilution by recycling a portion of the treated water. However, in a particular embodiment, the treated waters contain 20 to 40 percent by weight of sulfuric acid or ammonium sulfate.

The present process makes use of the known reaction of reduction of barium sulfate to barium sulfide by means of carbon. It has however been observed that this process was difficult to carry out. For example, the insoluble impurities accompanying the treated waters or resulting from the reacted materials, have the effect of progressively reducing the efficiency of the process. Moreover, it has been observed that the gaseous effluents obtained at various points of the installation could not be discharged as such in the atmosphere, in view of their polluting action.

The present process provides an economical way of solving these difficulties.

The invention concerns a process for treating a waste water containing sulfuric acid and/or ammonium sulfate, comprising the steps of : (1) reacting the waste water with barium sulfide, introduced at least partly in the solid state, so as to form a suspension of solid barium sulfate in waste water, (2) reacting the resulting barium sulfate at high temperature with carbon [containing inorganic impurities] so as to form solid barium sulfide [containing inorganic impurities] and a gas which is separated, (3) recycling to step (1) at least the major portion of the formed solid barium sulfide and (4) dissolving in water a minor portion of solid barium sulfide from step (2), separating the resulting solution from the insoluble impurities contained therein and (5) transferring at least one portion of the resulting purified solution to step (1).

DETAILED DESCRIPTION OF THE DRAWINGS

According to a first embodiment, waste water is reacted in a first step with barium sulfide (BaS). The latter may be used, for example, as a powder or in solution or suspension in water or in a gas. We preferably proceed with a slight shortage of barium sulfide with respect to $SO_4$ ions so that the pH during the operation and particularly at the outlet of the neutralization reactor is maintained between 3 and 7 and, preferably, between 4 and 6. The reaction is preferably conducted in a stirred reactor in order to completely exhaust the introduced BaS and to maintain in suspension the formed barium sulfate $BaSO_4$. The substantially pure hydrogen sulfide ($H_2S$) produced by the reaction may be converted in a burner to sulfur dioxide ($SO_2$) which can be used for example for manufacturing sulfuric acid. The $H_2S$ may also be converted to sulfur, for example by the Claus process. The precipitation of $BaSO_4$ may be conducted under atmospheric pressure or super atmospheric pressure and at room temperature or a higher temperature. The residence time is usually from 0.1 to 1 hour. A very significant parameter of this reaction is the pH at the outlet of the reactor which must be maintained below 7 in order to limit as much as possible the amount of soluble Ba, irrespective of its form, in the medium and, preferably, to a value lower than 10 ppm by weight corresponding to the solubility of $BaSO_4$ in water.

In a second step, the resulting barium sulfate suspension in water is fractionated, for example filtrated with or without filtration aids or dried or centrifuged. The solid precipitate consisting mainly of $BaSO_4$, but also possibly, of other organic and inorganic impurities, is advantageously washed with water.

In a third step, this precipitate is intimately admixed with carbon possibly containing inorganic impurities, for example coal or coke or, preferably finely crushed petroleum coke. This mixture is treated in an oven where $BaSO_4$ is reduced at high temperature by the carbon to BaS according to a well known process. We proceed for example at a temperature of from 700° to 1 500°C. During this operation, the organic impurities, if any, are incinerated and the inorganic impurities, as well as the coal ashes, are removed from the system by purging a portion of the produced BaS. At least the major portion (more than 50 percent) of the produced BaS is recycled to the neutralization reactor. The purged BaS fraction is defined by the amount of inorganic impurities, particularly ashes, to be removed from the system and by the stationary concentration compatible with a good operation of the oven. This fraction is, for example from 5 to 30 percent by weight. In a fourth step the purged BaS is treated with water, preferably at a temperature of 70° -80°C, in order to dissolve substantially all the BaS. The inorganic impurities insoluble in water, such as the gangue of $BaSO_4$ ore and the coal ashes and a few insoluble Ba compounds such as $BaCO_3$ and $BaCO_4$, are removed, for example by filtration or centrifugation. The resulting filtrate, containing BaS is, at least partly, recycled to the neutralization reactor. The residue may be discharged. However, in some cases, it may be interesting to react the same with a solution of HCl before its discharge in order to recover Ba in the form of $BaCl_2$ which can be subsequently treated by $H_2SO_4$ to form $BaSO_4$, which is recycled to the oven, and to regenerate HCl, which is recycled.

In a preferred additional stage, the fumes evolving from the oven, are subjected to dust-removal in dry conditions by means of cyclones or other devices commonly used for dry-dust removal and/or washed with a portion of the purified water. The so-washed fumes contain $H_2S$, $SO_2$, $CO_2$,etc... and may be advantageously oxidized for converting $H_2S$ to $SO_2$; they can be subjected to a final purification before being discharged. This purification may be advantageously carried out according to the process described in the French patents: No. E.N. 72 34076, No. E.N. 72 32342. For this purpose, the $SO_2$ contained in the gaseous effluent from the incinerator is washed out by means of an aqueous solution of ammonium sulfite and/or ammonia. The effluent gas usually contains less than 300 ppm of $SO_2$. The liquid effluent from the collector is treated by means of a BaS solution. The precipitated Ba salts (mainly Ba sulfite and sulfate), after filtration, are fed to the oven for reduction of the sulfates. The filtrate is introduced into a distillation or stripping tower in order to obtain a top fraction consisting of a mixture of steam, $NH_3$ and $H_2S$ and a bottom fraction consisting of water having a reduced $(NH_4)_2S$ content and which can be directly discharged. $H_2S$ after oxidation to $SO_2$, is fed to reactor 41 through line 25 of FIG. 1. The amount of $H_2S$ contained in line 25 corresponds to one half by moles of that contained in line 33. Sulfur is produced at the bottom of the reactor (line 32). The ammonia solution condensed at the top of the reactor is recycled through line 31 to the gas washer 40. The purified water line 15 discharged from filter 7 contains 2 000 to 3 000 ppm of dissolved $H_2S$ which must be removed before rejecting the water. This removal can be achieved in a tower by stripping with air, according to a preferred embodiment of this invention. The air outflow from the tower, containing more than 98 percent of the $H_2S$ of the water, is conveyed through line 44 to the incinerator 28.

Figure 1:
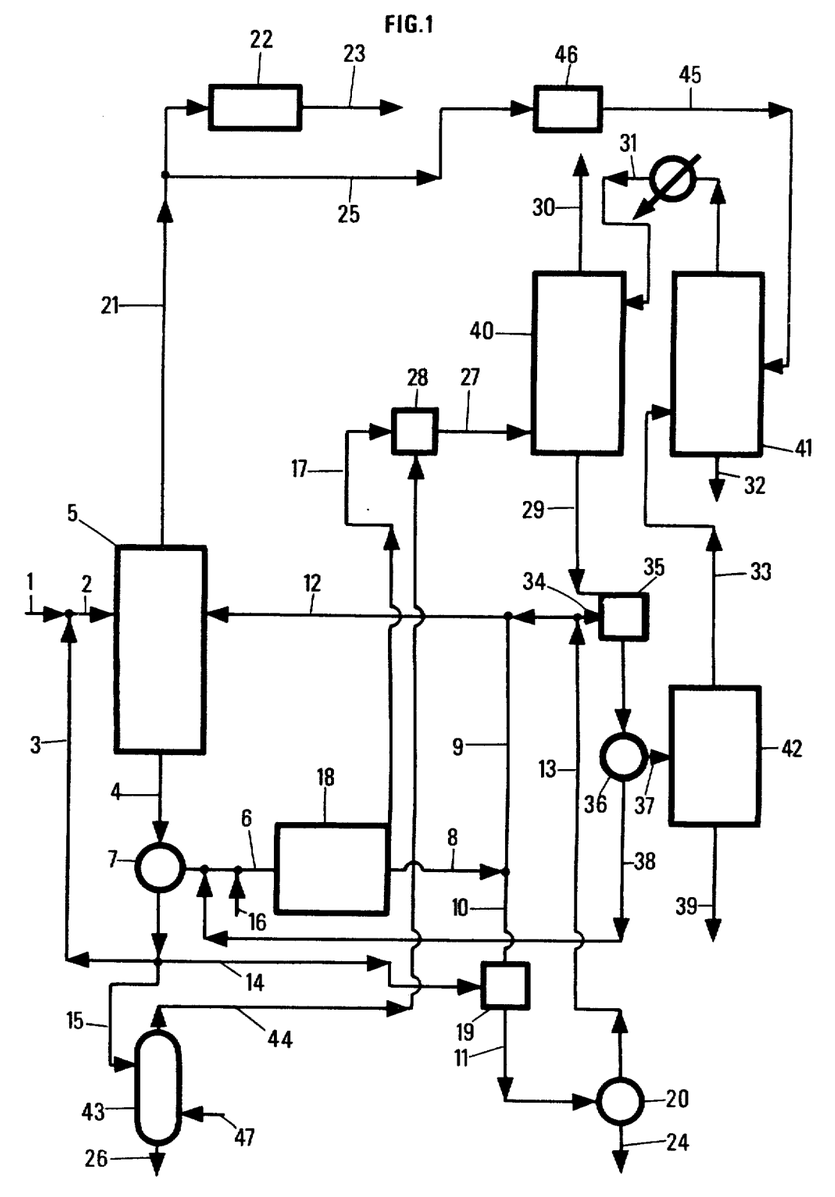
FIG. 1 is a schematic flow diagram illustrating a first embodiment which may be used when treating relatively dilute sulfuric acid containing waste water.

EXAMPLE 1 (FIG. 1)

The feed through line 1 consists of 32.7 T/h of waste waters containing 30 percent by weight of $H_2SO_4$ and suspended solids, i.e. 9.8 T/h of $H_2SO_4$ (100 kmoles). This waste water is so diluted as to contain 15 percent by weight of $H_2SO_4$, by recycling 32.6 T/h of filtrate through line 3. The so-diluted waste water is introduced into the neutralization reactor 5 through line 2. The same reactor is also fed through line 12 with a suspension of BaS in water having a BaS content of about 16.9 T/h. The neutralization of $H_2SO_4$ by BaS is conducted under controlled pH, the latter being maintained at a value of at most 6. The average residence time in the reactor is 0.25 h. In these conditions, the BaS attack is substantially complete. Through line 21, 3.2 T/h of $H_2S$ evolve which are subsequently converted to $SO_2$ in the burner 22. The formed $SO_2$ is fed through line 23 to the sulfuric acid manufacturing unit. The suspension formed in reactor 5 contains 23.3 tons of $BaSO_4$ and, in addition, impurities which are insoluble in water in substantially neutral medium and which are found, on the one hand, in the treated water and, on the other hand, in the barium sulfate discharged from the oven in which is carried out the $BaSO_4$ reduction.

This suspension is conveyed through line 4 to the liquid-solid separator 7 consisting, for example, of a filter. The filtration is facilitated by the use of incinerable filtration aids, for example having a cellulose or a porous coal base. The resulting filtrate (line 15) is very slightly acid and contains less than 10 ppm of soluble Ba in the form of $BaSO_4$.

This filtrate contains from 2 000 to 3 000 ppm of dissolved $H_2S$ which can be removed by stripping with air introduced into tower 43 through line 47. The air effluent (line 44) containing more than 98 percent of the $H_2S$ of the water, is sent to incinerator 28. The water free from the major portion of the $H_2S$ may then, if necessary, be sent through line 26 to the water purification station of the plant in order to be subjected to a finishing treatment.

The solid residue obtained on filter 7, after admixture with the necessary coal amount and additional $BaSO_4$ through line 16, is sent through line 6 to the reduction oven 18 where $BaSO_4$ is reduced to BaS at a temperature of 1 100°C. At the outlet from the oven 18.8 T/h of BaS in the solid form, admixed with solid impurities such as unreacted coal, $BaCO_3$, BaO, gangue due to the coal, etc... are recycled in major portion to the reactor 5 through lines (8-9-12). About 2 T/h of BaS (line 10) are dissolved in a dissolution reactor 19 with 10 T/h of filtrate coming from line 14.

The effluent is conveyed through line 11 to filter 20. After drying and washing in the unit 20, the mother liquors are returned to reactor 5 through line 13 and the residue is discharged through line 24. The gases issued from the oven (line 17) are subjected to a dust removal in dry conditions followed with a washing with water in a wet washer. The so-washed gases contain, in addition to the inert gases $N_2$ and $CO_2$, about 2 to 3 percent of the total sulfur introduced by $H_2SO_4$, in the form of $H_2S$ and $SO_2$. These gases are supplied through line 17 to the incinerator 28 and then through line 27 to the above-mentioned fume treatment unit. For this purpose, the fumes are treated in the gas washer 40 by means of an ammonia solution introduced through line 31. The purified fumes, containing less than 300 ppm by volume of $SO_2$, may be rejected to the atmosphere through line 30. The solution of ammonium sulfite and sulfate obtained from the bottom of the washer (line 29) is treated in a stirred reactor 35 by means of a BaS solution coming from line 34. The mixture of $BaSO_4$ and $BaSO_3$ obtained after filtration 36, which amounts to 2.5 T/h, is conveyed through line 38 to the oven 18.

The resulting ammonium sulfide solution (line 37) is distilled in tower 42. We obtain, from the bottom of the tower, through line 39, waste water which can be rejected and, at the top, from line 33, $H_2S$, $NH_3$ and water vapor which are transferred to reactor 41 in order to produce sulfur (line 32) by reaction with a corresponding amount of $SO_2$ fed through line 45.

This $SO_2$ is obtained by combustion in the incinerator 46 of a small portion (line 25) of the $H_2S$ produced in reactor 5. The ammonia solution obtained by condensation of the top effluent from reactor 41 is recycled through line 34 to collector 40.

The performance of the process of the invention is sometimes made difficult when the waste sulfuric waters contain impurities producing, during the reaction with barium sulfide, an evolution of gaseous compounds accompanying the main $H_2S$ gaseous effluent. The further use of the $H_2S$ may be thus jeopardized, depending on the nature of the impurities accompanying it. These impurities may be, for example, HCl, metal chlorides or hydrocarbyl halides.

This inconvenience may be avoided in a second mode of operation of this invention.

In this second mode, we proceed to a preliminary selection of waste sulfuric waters of different origins and we feed the zone of reaction with barium sulfide only with those waste waters which, by reaction with BaS, do not produce compounds impeding the subsequent operations.

The complementary portion of the waste sulfuric waters, which may or not contain impeding impurities, is fed to a reactor intermediate between the $SO_2$ absorber and the reactor for converting ammonium sulfite to barium sulfite. In this intermediate reactor, sulfuric acid reacts with ammonium sulfite with production of $SO_2$. The $SO_2$ evolved during this reaction is conveyed to the enclosure where is carried out the reaction between $H_2S$ and $SO_2$, in view of producing elemental sulfur.

According to some preferred operating conditions which will be specified later, the $SO_2$ amount thus fed to this intermediate reactor may contribute to reduce or even avoid the independent production of $SO_2$ by $H_2S$ combustion. The respective amounts of the two separate flows of waste sulfuric waters may vary within a wide range, the only condition being that the total amount of the waste sulfuric waters which may give rise to contaminents of $H_2S$ be included in the feed of the intermediate reactor.

Figure 2:
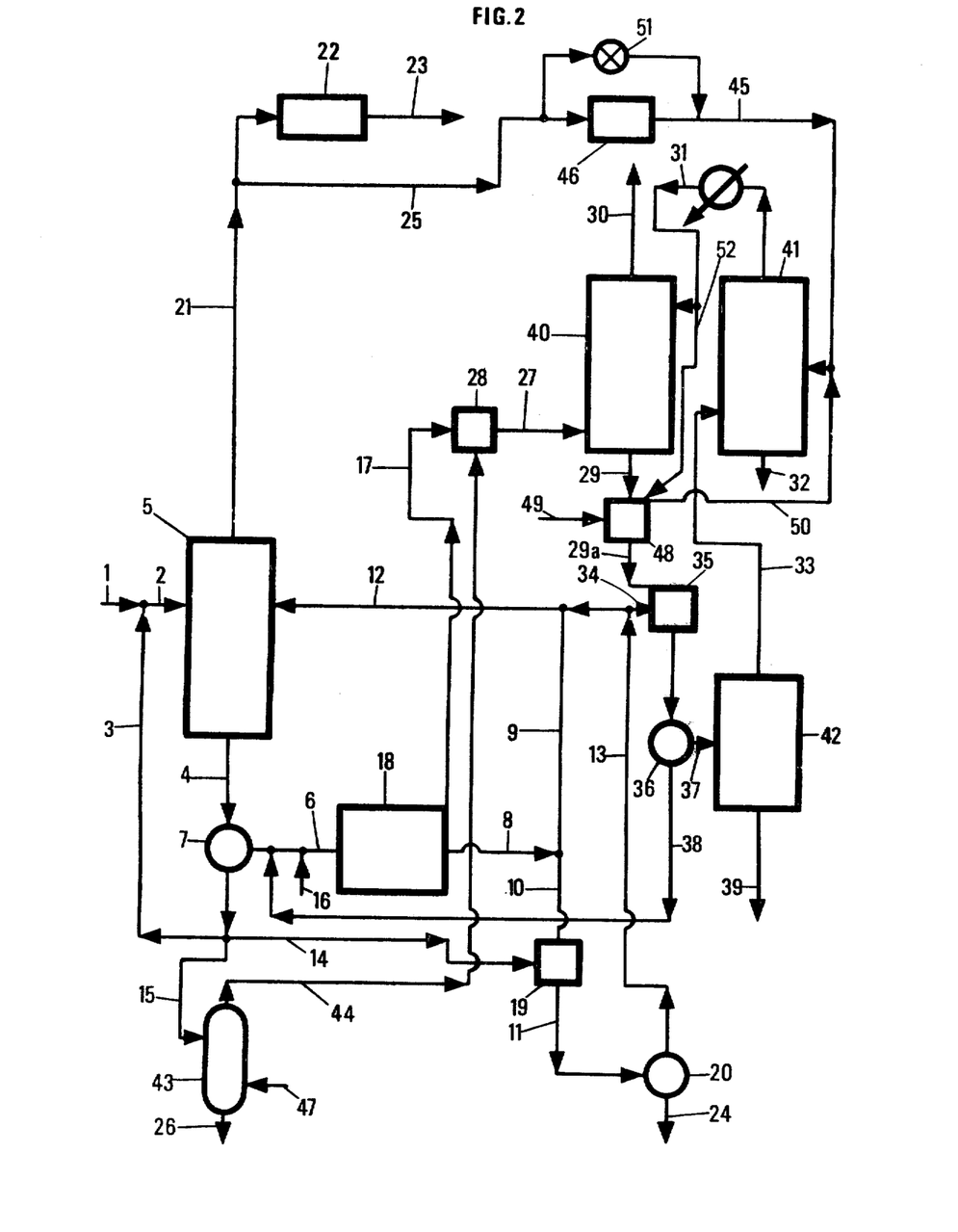
FIG. 2 is a modification of the diagram of FIG. 1 concerning the treatment of two different streams of sulfuric acid containing waste water.

FIG. 2 illustrates the performance of this technique.

The equipments denoted with references (1) to (47) are the same as in FIG. 1 and, accordingly, it will not normally be made reference to them.

The intermediate reactor referenced 48 and placed on line 29, is fed with waste sulfuric water containing impeding impurities, through line 49, while other less polluted sulfuric waters are treated in reactor 5. This reactor is fed with an aqueous solution of ammonium sulfites through line 29 and, in some cases, with additional ammonia from line 52. The outflow from this reactor consists of an aqueous solution containing ammonium sulfates and sulfites (duct 29a connected to reactor 35) and of a gaseous effluent of high $SO_2$ content (duct 50). In some operating cases, particularly when the production of $SO_2$ duct 50 is sufficiently high with respect to that of $H_2S$ (line 33) to comply with the stoichiometry of the reaction between $H_2S$ and $SO_2$ in reactor 41, it will be needless to incinerate $H_2S$ in reactor 46. When the production of $SO_2$ is higher than the stoichiometry, it will be not only convenient to omit the incineration 46 but also the additional $H_2S$ will be sent to reactor 41 through line 51.

The different modes of operation of the invention in this particular case, will be illustrated by examples 2 to 4. The flow sheet is that of FIG. 2.

The plant will be operated as in the first mode of operation of the invention except that a portion of the waste sulfuric waters will be sent to reactor 48.

In view of making easier the understanding of the specification, the three examples relate to the same hourly feeding rate of the absorber 40 with 100 moles of $SO_2$, through line 27.

The ammonia hourly flow rate through line 31 is such that the resulting sulfitic liquor contains 50 moles of ammonium hydrogen sulfite and 50 moles of diammonium sulfite.

The stoichiometrical reaction taking place in the absorber, may be written:

This basic case is not to be considered as a preferred embodiment and has been given only for illustrative purpose. In particular, any other ratio between the sulfite and the hydrogen sulfite can be used as well.

EXAMPLE 2

To the sulfitic liquor recovered from the bottom of absorber 40, containing 50 moles of $NH_4H\ SO_3$ and 50 moles of $(NH_4)_2SO_3$, we add 50 moles of $H_2SO_4$ in the form of waste sulfuric waters containing impeding impurities, introduced through line 49.

The reaction taking place in the intermediate reactor (48), gives a mixture of ammonium sulfate and ammonium hydrogen sulfite according to the stoichiometrical reaction:

The resulting aqueous solution is fed to reactor 35 where it is reacted with the stoichiometrical amount of BaS according to the reaction:

After filtration or centrifugation in separator 36, the resulting liquor is subjected to a decomposition in reactor 42, according to the reaction:

The so-produced gases are fed to reactor 41 where they react with 50 moles of $SO_2$ coming from reactor 48 through line 50, thereby producing 150 moles of sulfur recovered from the bottom of reactor 41 and fed to the absorber so as to close the ammonia cycle.

The total equation of these reactions may be written

The barium salts are fed to the reduction oven 18 so as to regenerate the barium sulfide required for the reaction. As reducer, we use coke containing 10 percent b.w. of ash and 2 percent b.w. of surfur.

EXAMPLE 3

To the sulfitic liquor of example 2, we add 150 moles of $H_2SO_4$ containing impeding impurities. The following reaction takes place in reactor 48:

$SO_2$ evolves and the obtained solution is treated with BaS:

After centrifugation, the solution is heated so as to liberate $H_2S$ and $NH_3$:

The amount of produced $H_2S$ is not sufficient for stoichiometrically reacting with $SO_2$ from line 50. Accordingly 50 moles of additional $H_2S$ are fed through lines 21, 25, 51, 45. 300 moles of sulfur are thus produced in reactor 41. The ammonia is fed to absorber 40, thus closing its cycle.

The total equation of these reactions may be written :

$$2 SO_2 + 3 H_2SO_4 + 3 BaS + H_2S \rightarrow 3 Ba SO_4 + 4 H_2O + 6 S$$

The barium sulfate is converted to barium sulfide as indicated in example 2.

EXAMPLE 4

To the sulfitic liquor of example 2, we add 300 moles of $H_2SO_4$ containing impeding impurities. The following incomplete reaction should have then to take place :

$$50 NH_4H SO_3 + 50 (NH_4)_2SO_3 + 300 H_2SO_4 \rightarrow 100 SO_2 + 100 H_2O + 150 H_2SO_4 + 150 NH_4H SO_4$$

If fed to reactor 35, this strongly acid liquor is liable to lose $H_2S$ in this reactor. In order to avoid this inconvenience, a portion of the recycled ammonia is fed to reactor 48 through line 52. The ammonia amount to be added for neutralizing the sulfuric acidity is 150 moles of $NH_3$. The total stoichiometrical reaction in reactor 48 can thus be written :

$$50 NH_4H SO_3 + 50 (NH_4)_2SO_3 + 300 H_2SO_4 + 150 NH_3 \rightarrow 300 NH_4H S O_4 + 100 SO_2 + 100 H_2O$$

By reaction with BaS, we obtain :

$$300 NH_4H SO_4 + 300 BaS \rightarrow 300 Ba SO_4 + 300 NH_4 H S$$

$BaSO_4$ is reduced to BaS by means of coal and the aqueous solution of $NH_4H S$ is decomposed by heating as follows :

$$300 NH_4H S \rightarrow 300 NH_3 + 300 H_2S$$

Finally, the ammonia will be found partly at the inlet of the absorber 150 moles and partly at the inlet of the reactor 48 150 moles. The ammonia thus closes its cycle. At that time, $H_2S$ is in excess with respect to $SO_2$ and it will be convenient to produce the lacking $SO_2$ by incinerating a portion of the $H_2S$ which is fed to incinerator 46 through line 25. The required $SO_2$ amount is 50 moles.

It has been mentioned above that the process of the invention could be used for treating waste sulfuric waters containing from 1 to 40 percent by weight of sulfuric acid. However, in the case of high concentrations, it was necessary to dilute the waste water by means of a filtrate produced in the step of filtration of Ba $SO_4$ produced by reaction of BaS with sulfuric acid, It has been observed that, for sulfuric acid concentrations from 20 to 40 percent by weight, it was not only useless to recycle a portion of the filtrate, but that, in addition, the filtration step could be completely omitted, thereby resulting in a considerable simplification of the treatment with the substantial advantages resulting therefrom. This constitutes a third mode of operation of the invention.

As a matter of fact, it has been observed that it was difficult to remove from the filtrate produced by filtration of the barium sulfate obtained by reacting sulfuric acid with barium sulfide, the soluble organic impurities already present in the starting material or produced by the reaction of initially present organic impurities with the reactants. Said removal of the soluble organic compounds would require a costly complementary treatment. By using the third mode of operation of the invention, it is possible to completely avoid this inconvenience.

Moreover, this third mode of operation of the invention has a very particular advantage in the case of waste waters containing ammonium sulfate without free sulfuric acid. In this case, no gas evolves from the neutralization reactor. The $SO_2$ amount required by the reaction in order to produce elemental sulfur is then obtained in a known manner, for example by sulfur combustion.

The third mode of operation concerns particularly the treatment of waste waters whose concentration of sulfuric acid and/or ammonia sulfate is substantially high, for example about 20 to 40 percent by weight and optionally containing soluble organic impurities which do not react with barium sulfide or react with the same by producing soluble organic compounds and/or inorganic impurities.

When the sulfuric acid and/or ammonium sulfate concentration is too high and exceeds about 40 percent by weight, it is convenient to dilute the feed charge with water. Such water may be advantageously taken from the purified effluent at the outlet of the treatment unit.

The mechanical design of the reactor is substantially different from that hereinbefore recommended: as a matter of fact, the high apparent viscosity of the semi-solid paste resulting from the chemical reaction and the necessity of obtaining a sufficient homogeneity of the composition and of the temperature while permitting the evolution of $H_2S$ as completely as possible, make it necessary to use malaxing devices such as axial mixers with Archimede screw, planet mixers, z mixers, etc .

The further treatment of this semi-solid paste is different according to the fact that the waste waters contain or not ammonium sulfate.

Figure 3:
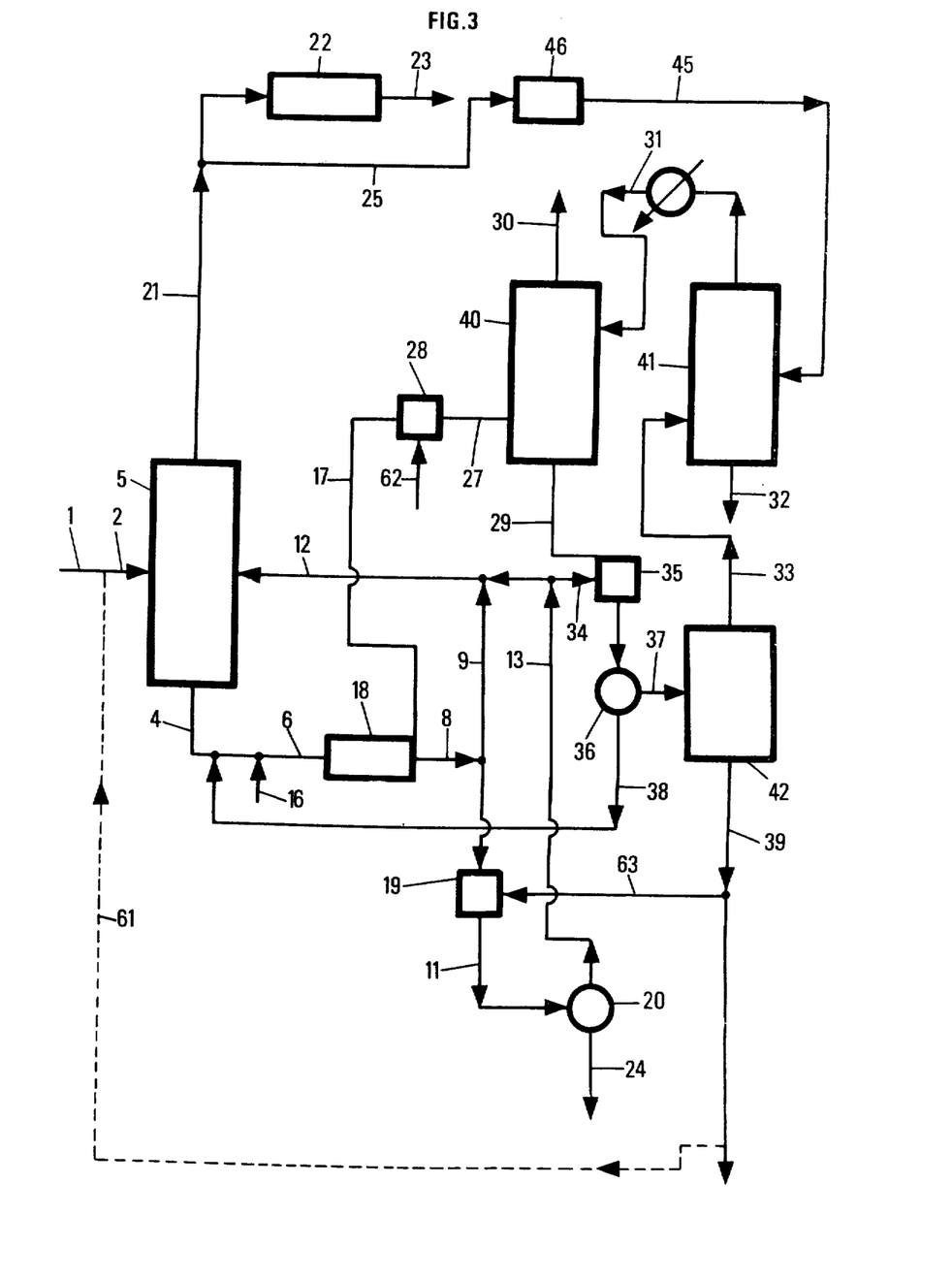
FIG. 3 is a modification of the diagram of FIG. 1 concerning the treatment of relatively concentrated sulfuric acid containing waste water.

When the waste sulfuric waters do not contain or only contain negligible amounts of ammonium sulfate, the paste issued from the mixer-degazifier reactor 5 is directly conveyed to the oven 18 for reduction of Ba $So_4$. The subsequent steps of the treatment are the same as hereabove described. The complete flow sheet is given in FIG. 3. The organic impurities accompanying $BaSO_4$ are destroyed in the oven 18, partially incinerated in the oven itself or rejected with the gases. These gases are fed to the incinerator 28 together with air from duct 62 ensuring the conversion of the sulfur-containing compounds to $SO_2$ and the complete incineration of the organic impurities.

When the waste waters contain ammonium sulfate in substantial amount, wheter or not free sulfuric acid is still present, it is observed that the treatment carried out in reactor 5 has converted the ammonium sulfate to ammonium sulfide.

Figure 4:
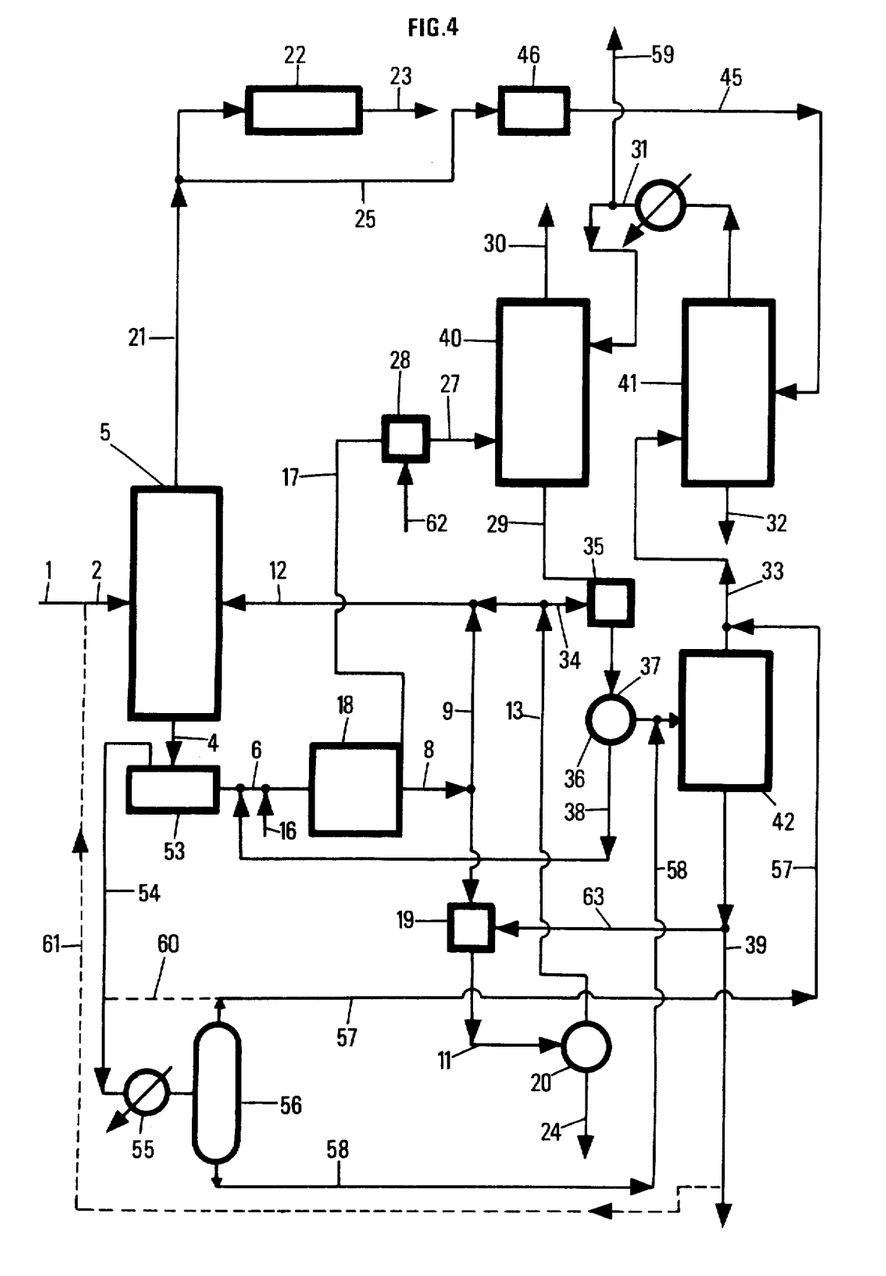
FIG. 4 is a modification of the diagram of FIG. 3 concerning the treatment of ammonium sulfate containing waste water.

For recovering the ammonium sulfide, a modification of the flow sheet in conformity with FIG. 4 is necessary.

In view of recovering the ammonium sulfide contained in the paste, the latter is fed to a stove 53. We proceed, either by indirect heating, performed, for example, by means of tubes heated with steam or by direct heating, for example by means of steam or hot gases, to the removal of the ammonium sulfide in the form of $H_2S$ and $NH_3$. This operation can be performed continuously or batchwise in a single stove or in several stoves in series.

The operation may consist only in the removal of ammonium sulfide but it may also be conducted so as to completely dry the paste issued from reactor 5.

The paste having a variable degree of dryness is subsequently fed, in a known manner, to the reactor 18 for reduction of Ba SO₄.

The vapors evolving from the stove 53 through line 54 essentially contain $NH_3$, $H_2S$ and variable amounts of steam.

Preferably these vapors will be subjected to a partial condensation 55, 56; the condensate line 58 will be fed to stripper 42 and the uncondensed fraction line 57 will feed reactor 41. it is however possible to directly supply these vapors to reactor 41 through line 60.

A portion of the ammonia recovered at the top of reactor 41, will be reused in the form of an aqueous solution in view of absorbing $SO_2$ in the absorber 40 The exceeding portion will be withdrawn from the system through line 59 in the form of an aqueous ammonia solution containing traces of ammonium sulfide.

When the charge contains ammonium sulfate without free sulfuric acid, the lines 21, 23, 25 and the units 22 and 46 can be omitted. The sulfur dioxide necessary for the reaction taking place in the reactor 41, may be introduced through line 45. It is produced, for example, by sulfur combustion.

The water necessary for dissolving BaS in the reactor 19 is taken from duct 39, through duct 63. Through duct 61, it is possible to dilute the waste waters when their concentration is too high.

These examples have been successfully repeated with other materials under claimed conditions. For example coals or cokes containing or producing from 0.1 to 20 percent b.w.of ash (such as $SiO_2$, iron oxides, calcium and iron silicates, barium oxide or silicate and the like).

According to a preferred embodiment, there is used highly sulfurized coke (S content of about 1–15 % b.w.) which is normally valueless but which yields her gaseous sulfur compounds ($H_2S$ and $SO_2$) which are useful to the process : they are discharged through pipe 17 and converted in reactor 28.

We claim:

1. A process for treating waste water containing sulfuric acid and/or ammonium sulfate, comprising the steps of : (a) reacting the waste water with ash-containing solid barium sulfide recovered from the following step (c) and with an aqueous solution of barium sulfide recovered from the following step (e), to form a suspension of ashcontaining solid barium sulfate in the waste water at a pH of 3 – 7, the proportions of said solid barium sulfide from step (c) and said barium sulfide supplied as solution from step (e) being respectively 70 – 95 percent and 5 – 30 percent of the total barium sulfide, (b) reacting the resulting barium sulfate with coal or coke containing 0.1 – 20 percent b.w. of ash, at 700°– 1500°C, to form ash-containing solid barium sulfide and a gas containing $H_2S$ and $SO_2$ which is separated, (c) recycling to step 1 at least the major portion of the ash-containing solid barium sulfide formed in step (b), and (d) admixing water with a minor portion of the ash-containing solid barium sulfide formed in step (b), thereby obtaining a barium sulfide solution and insoluble ash, separating said barium sulfide solution from said insoluble ash and (e) recycling at least one portion of the barium sulfide solution obtained in step (d) and separated from the ash to step (a).

2. A process according to claim 1 in which the waste water contains from 1 to 40 percent by weight of sulfuric acid.

3. A process according to claim 1 in which the pH of the barium sulfate suspension at the end of step (a) is from 4 to 6.

4. A process according to claim 1 in which the average reaction time of step (a) is from 0.1 to 1 hour.

5. A process according to claim 1 in which the gas formed in step (b) is subsequently treated with a gas containing free oxygen for converting the hydrogen sulfide contained in said gas to sulfur dioxide.

6. A process according to claim 5 in which the gas formed in step (b), before treatment with a gas containing free oxygen, is subjected to dust removal and/or washing with water.

7. A process according to claim 5 in which, after conversion of hydrogen sulfide to sulfur dioxide, the gas is washed with an aqueous solution of ammonium sulfite and/or ammonia, to dissolve the sulfur dioxide and obtain a solution of ammonium sulfite and/or bisulfite.

8. A process according to claim 7 in which the obtained solution of ammonium sulfite and/or bisulfite is reacted with an aqueous solution of barium sulfide to produce insoluble barium sulfites and/or sulfates and a residual aqueous phase containing hydrogen sulfide and ammonia, and separating said insoluble barium sulfites and/or sulfates from said residual aqueous phase.

9. A process according to claim 8 in which the barium sulfites and/ or sulfates are recycled to step (b).

10. A process according to claim 8 in which the residual aqueous phase is subjected to distillation or stripping with an inert gas, to obtain a hydrogen sulfide- and ammonia-containing gas.

11. A process according to claim 10, in which the hydrogen sulfide and ammonia-containing gas is reacted with the sulfur dioxide produced according to claim 22.

12. A process according to claim 1 in which, after step (a), at least one portion of the waste water is separated from the solid barium sulfate, the latter is fed to step (b) and the separated waste water is treated with an air stream, so as to carry away the hydrogen sulfide contained therein, the resulting gas, containing free oxygen, being then heated in order to convert the hydrogen sulfide to sulfur dioxide.

13. A process according to claim 1 in which waste water of other origin, containing sulfuric acid, is fed to an enclosure in which said waste water is contacted with an aqueous solution of ammonium sulfite so as to form gaseous sulfur dioxide and an aqueous solution containing ammonium sulfate, said solution being subsequently treated with barium sulfide so as to form insoluble barium salts and ammonium sulfide, the barium salts being used in step (b), the ammonium sulfide being decomposed by heating to a gaseous mixture of hydrogen sulfide and ammonia, said mixture of hydrogen sulfide and ammonia being subsequently reacted with sulfur dioxide to produce elemental sulfur with evolution of ammonia.

14. A process according to claim 13, in which the waste water of other origin fed to the enclosure for being contacted with an aqueous solution of ammonium sulfite, is waste sulfuric acid containing water, capable of generating, by reaction with barium sulfide, gaseous compounds which contaminate hydrogen sulfide and jeopardize its further use.

15. A process according to claim 13, in which the amount of sulfuric acid present in said waste water of other origin, exceeds the amount necessary for ensuring the evolution of all the potential $SO_2$ contained in the aqueous solution of ammonium sulfite, so that the formed aqueous solution containing ammonium sulfate also contains sulfuric acid.

16. A process according to claim 15, in which ammonia is added to said aqueous solution containing ammonium sulfate and sulfuric acid, the amount of ammonia being sufficient to convert said sulfuric acid to ammonium bisulfate.

17. A process according to claim 1 in which, during step (a), waste water containing about 20 to 40 percent by weight of sulfuric acid and/or ammonium sulfate is treated with powdered barium sulfide to form a wet semi-solid paste containing a high proportion of $BaSO_4$, which is fed in totality to step (b).

18. A process according to claim 17, in which the waste water supplied to step (a) contains ammonium sulfate, whereby the semi-solid paste obtained by reaction of said waste water with barium sulfide contains ammonium sulfide produced by reaction of ammonium sulfate with barium sulfide, and said semi-solid paste is heated to produce a gas containing steam, ammonia and hydrogen sulfide, and said gas is separated from the semi-solid paste.

19. A process according to claim 18, in which said separated gas containing steam, ammonia and hydrogen sulfide is admixed with sulfur dioxide to produce elemental sulfur by reaction of hydrogen sulfide with sulfur dioxide.

20. A process according to claim 18, in which said separated gas containing steam, ammonia and hydrogen sulfide is subjected to partial condensation for removing water therefrom, the uncondensed vapors being reacted with sulfur dioxide to produce elemental sulfur.

21. A process according to claim 1 wherein the treated waste-water contains sulfuric acid, whereby hydrogen sulfide is formed in step (a) and is separated from the suspension of solid barium sulfate in the waste-water.

22. A process according to claim 21, wherein at least a portion of the hydrogen sulfide separated from the suspension of solid barium sulfate in the waste-water is reacted with oxygen to produce sulfur dioxide.

23. A process according to claim 1 wherein the ash of said coal or coke contains silicium dioxide, iron oxide, calcium silicate, iron silicate, barium oxide or barium silicate.

24. A process according to claim 1 wherein the ash of said ashcontaining solid barium sulfide contains unreacted coal, barium carbonate, barium oxide or gangue from coal.

* * * * *